March 15, 1927.  F. W. PETERS  1,621,219
UNIVERSAL JOINT
Filed April 22, 1925
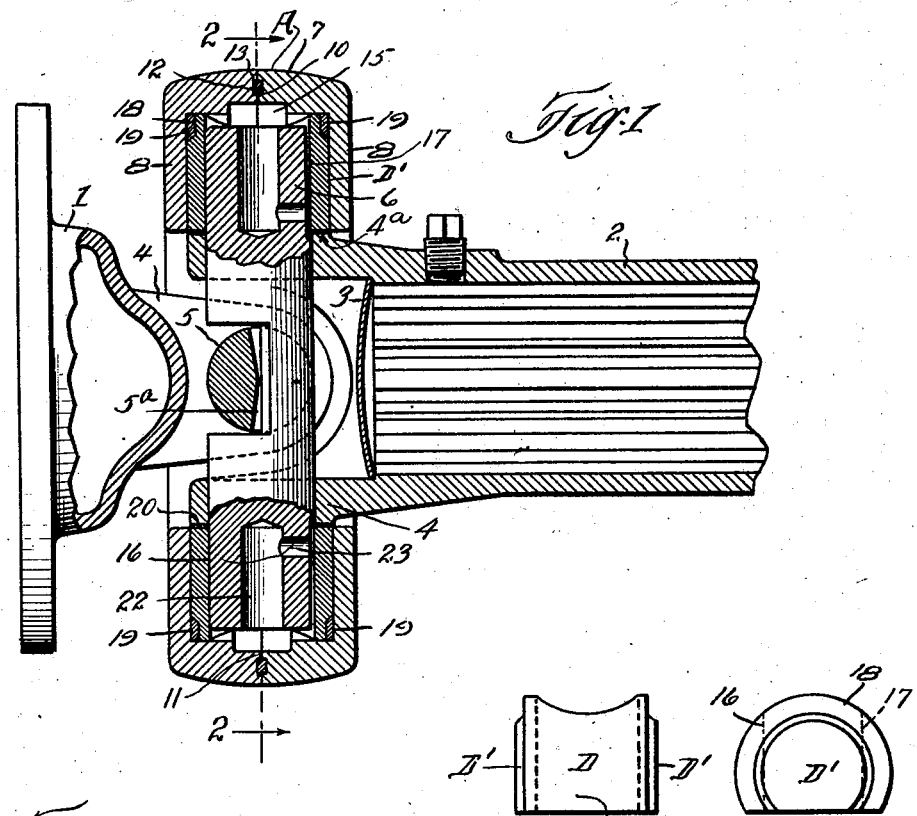
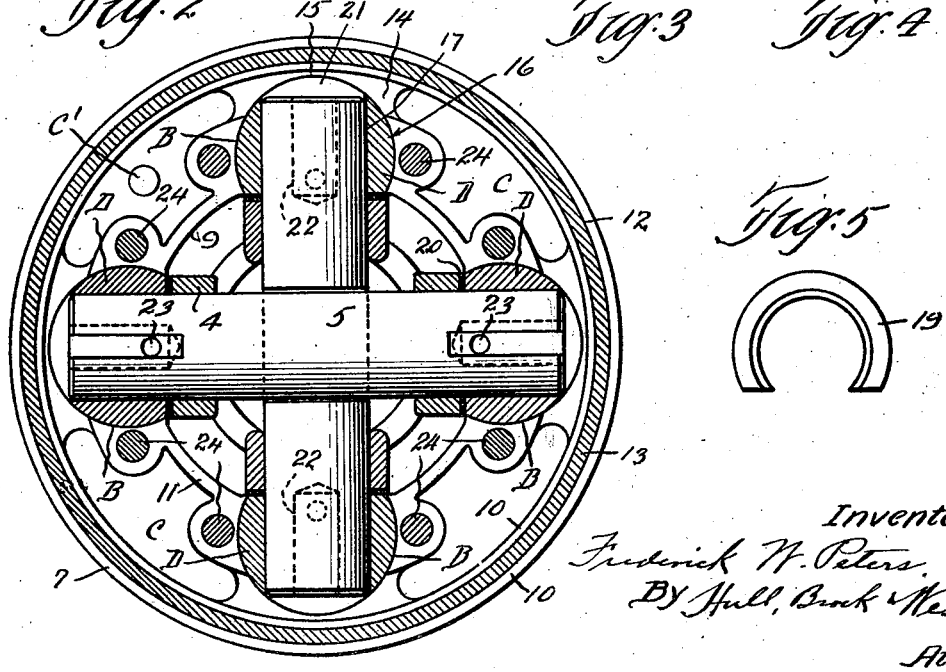
Inventor
Frederick W. Peters.
By Hull, Brock & West,
Attys.

Patented Mar. 15, 1927.

1,621,219

UNITED STATES PATENT OFFICE.

FREDERICK W. PETERS, OF CLEVELAND, OHIO, ASSIGNOR TO SPICER MANUFACTURING CORPORATION, OF SOUTH PLAINFIELD, NEW JERSEY, A CORPORATION OF VIRGINIA.

UNIVERSAL JOINT.

Application filed April 22, 1925. Serial No. 24,928.

This invention relates to universal joints, and more particularly to joints of the character wherein the trunnions are mounted in and connected by a member in the shape of a ring having a chamber or chambers for lubricant therein. It is the general purpose and object of the invention to provide a construction of universal joint of this character wherein the trunnions may be efficiently lubricated; also to provide a joint which is practically leak-proof, which is cheap of manufacture, and which is easily assembled and disassembled.

Further and more limited objects of the invention will appear hereinafter and will be realized in and through the construction and arrangement of parts shown in the drawings, wherein Fig. 1 represents a sectional elevation of a universal joint embodying the invention; Fig. 2 a similar view, taken at right angles to Fig. 1; Fig. 3 a side elevation and Fig. 4 an end elevation of one of the bearing blocks; and Fig. 5 an elevation of one of the packing rings employed with said bearing blocks.

Describing the various parts by reference characters, 1 and 2 denote hubs by means of which the joint is connected to shaft sections (not shown), the hub 2 being shown as adapted for a splined connection with its shaft section, the outer end of the hub bore being closed by a plate 3. The hubs are provided each with a yoke, the arms 4 of each yoke having a cross pin 5 mounted therein, the outer ends 6 of each cross pin constituting trunnions. Each cross pin is shown as provided with a central recess 5ª of slightly greater depth than the radius of such pin, each recess being about 210° in angular extent to accommodate the rocking movements of the pins. The trunnions are adapted to be mounted in bearing blocks carried by and supported within a connecting member in the form of a ring, the ring being indicated generally at A. The ring is preferably made from two symmetrical sections each comprising an outer cylindrical wall 7, an annular side wall 8, and an inner cylindrical wall 9, the inner wall being segmental or discontinuous. The ring sections are made of malleable castings and the meeting edges 10 and 11 are machined to secure a close fit therebetween. Each of the meeting edges 10 and 11 is provided with a channeled annular recess 12 which, when the sections are assembled, provides an annular groove located radially outwardly from the seats B, which groove receives a packing gasket 13.

Each ring section is provided, within the side wall 8 thereof, with a seat recess extending transversely thereof through the edge 10 or 11 thereof, said recesses forming, when the sections are assembled, seats B for the bearing blocks, said seats each being in the shape of a segment of a cylinder intersecting the inner wall of the ring and having a circumferential extent in excess of 180°, whereby the seats permit their respective blocks to rock therein while preventing radial inward movement of the said blocks.

It will be noted that the space between the outer wall and the segmental inner wall of the ring is divided into a plurality of chambers C, said chambers being separated from each other by means of the side walls of the seats B and by the bearing blocks inserted within such seats. Each chamber C is adapted to communicate with the interior of the seats B on each side thereof through large openings 14 formed in the walls of said seats, thereby to lubricate the outer surfaces of the bearing blocks. The chambers C are enabled to communicate with each other and to provide for the circulation of the lubricant by centrifugal action, by means of the ports 15, formed in the outer portions of the seats, said ports forming passages, beyond the trunnions, connecting the adjacent chambers C. The ports 15 merge at their inner ends with the openings 14. For the purpose of supplying the chambers with lubricant, one such chamber is provided with a filling opening C' closed by a plug.

Cooperating with the seats B are the bearing blocks, each of which is indicated generally at D, the blocks being so shaped as to fit within the said seats and each having an external wall 16 of the same general contour as the wall of its seat, except as such contour is modified by the extension of the cylindrical radial bore 17 therethrough. The ends of the blocks D are reduced, as shown at D', providing around each such extension a segmental annular seat 18 for the reception of a washer 19, each such reduced extension being concentric with the body of the block.

Between each bearing block and the adjacent shoulder 4ª on the adjacent yoke arm, and surrounding each trunnion, is a washer 20.

Each bearing block is provided with a port 21, beyond the trunnion therein, adapted to register with a port 15 and form therewith a continuous passage extending across the ends of each trunnion and between the same and the cooperating part of the seat D, the ports 15 and 21 connecting adjacent chambers C. The ports 15 and 21 communicate with a central axial chamber 22 extending inwardly from the outer end of each trunnion, from which chamber a port 23 extends to the seat provided for each trunnion within its bearing block, the ports 23 extending at right angles to the plane of rotation of the ring.

With the parts constructed and arranged as described, the hubs, with their trunnions and the bearing blocks thereon, are applied to the ring by securing the two ring sections together by means of the bolts 24, seeing that the washers 19 are in place and that the packing ring 13 is seated on one of the recesses 12. By setting up the nuts on the said bolts, the ring sections will be secured together in such manner as to form a tight joint between the meeting edges 10 and 11 thereof compressing the packing ring 13 and forcing the washers 19 against their seats and about the extensions D'. The ring 13 and washers 19 are located at the points where greatest pressure of lubricant is exerted, due to the centrifugal action, and effectually seal the joints between the ring sections and between the blocks and the ring at such places; and the whole construction enables the parts to be assembled and disassembled quickly and conveniently and reduces to a minimum the liability of leakage. Furthermore, the construction of the bearing blocks and the manner of mounting the same enables them to align themselves properly with respect to the cross pins and the trunnions during the assembling operation and during the operation of the joint.

The shape of the seats B and blocks D enables the blocks to be retained in the seats against radial inward movement, but with the capability of rocking in said seats thereby to facilitate the assembling operation.

By reason of the construction illustrated and described herein, I am enabled to provide a joint of the character referred to hereinbefore which is simple and economical of production, which will reduce to a minimum the machining operations, and which will also reduce to a minimum the liability of lubricant to leak therefrom.

Having thus described my invention, what I claim is:—

1. In a universal joint, the combination, with a driving and a driven member and trunnions carried thereby, of a hollow lubricant-containing connecting ring for said trunnions, the said ring having seats extending transversely thereof and located entirely within the sides of said ring, bearing blocks for said trunnions within said seats and entirely within the sides of said ring, the seats intersecting the inner wall of the ring, and packing means interposed between opposite end portions of each block and the surfaces of the seats adjacent thereto.

2. In a universal joint, the combination, with a driving and a driven member and trunnions carried thereby, of a hollow lubricant-containing connecting ring for said trunnions, the said ring comprising a pair of sections and having seats extending transversely thereof and located entirely within the sides of said ring, bearing blocks for said trunnions adapted to be placed within said seats and entirely within the sides of said ring, means for securing the said sections together with the blocks in their respective seats, and packing means interposed between opposite end portions of each block and the corresponding surfaces of the said seats.

3. In a universal joint, the combination, with a driving and a driven member and trunnions carried thereby, of a hollow lubricant-containing connecting ring for said trunnions, the said ring comprising a pair of sections and having seats extending transversely thereof and located entirely within the sides of said ring, bearing blocks for said trunnions mounted in said seats and each having a reduced extension at one end thereof, said extensions being located within the sides of said ring, a washer extending about each such extension in engagement with the adjacent end wall of its seat and sealing the joints between the opposite ends of said blocks and their seats.

4. In a universal joint, the combination, with a driving and a driven member and trunnions carried thereby, of a hollow lubricant-containing connecting ring for said trunnions, the said ring having seats extending transversely thereof and located entirely within the sides of said ring, the said seats intersecting the inner wall of the said ring, bearing blocks for said trunnions mounted in said seats and each having a reduced extension at one end thereof, said extensions being located within the sides of said ring, a washer extending about each such extension in engagement with the adjacent end wall of its seat and sealing the joints between the opposite ends of said blocks and their seats, the said blocks being provided each with a radial bore for a trunnion which is adapted to register with the opening formed by the intersection of its seat with the inner wall of the ring, the blocks and their seats being so shaped as to permit the blocks to rock in their seats.

5. In a universal joint, the combination, with a driving and driven member and trunnions carried thereby, of a hollow lubricant-containing connecting ring for said trunnions, the said ring comprising a pair of symmetrical ring sections adapted to be assembled to form a complete ring, each section having a seat recess extending transversely thereof and located within the side wall thereof, each such seat recess being in the shape of a segment of a cylinder in excess of 180° with its base formed by the intersection of such recess with the inner wall of such ring section, bearing blocks for said trunnions adapted to be inserted within and conforming in shape to the seats formed by assembling the ring sections, means for packing the ends of the said blocks to prevent leakage between the same and the end walls of the said seats, and means for connecting the said sections.

6. In a universal joint, the combination, with a driving and driven member and trunnions carried thereby, of a hollow lubricant-containing connecting ring for said trunnions, the said ring comprising a pair of symmetrical ring sections adapted to be assembled to form a complete ring, each section having a seat recess extending transversely thereof and located within the side wall thereof, each such seat recess being in the shape of a segment of a cylinder in excess of 180° with its base formed by the intersection of such recess with the inner wall of such ring section, bearing blocks for said trunnions adapted to be inserted within and conforming in shape to the seats formed by assembling the ring sections, means for packing the ends of the said blocks to prevent leakage between the same and the end walls of the said seats, and means for connecting the said section, with their meeting edges in engagement.

7. In a universal joint, the combination, with a driving and a driven member and trunnions carried thereby, of a hollow lubricant-containing connecting ring for said trunnions, said ring comprising a pair of symmetrical sections adapted to be assembled to form a complete ring, with intermediate contact edges, each such ring section having seat recesses each having its outer end within the side wall thereof and extending inwardly therefrom across such ring section, each seat recess being in the shape of a segment of a cylinder in excess of 180° and intersecting the inner wall of such ring section, bearing blocks for said trunnions conforming in shape to the seats provided by assembling the said ring sections, each block having a reduced extension at each end thereof with a segmental annular seat around such extension, a segmental annular washer in each seat adapted to be compressed around each extension by assembling the ring sections, and means for connecting the said end sections together.

8. In a universal joint, the combination, with a driving and a driven member and trunnions carried thereby, of a hollow lubricant-containing connecting ring for said trunnions, the said ring comprising a pair of symmetrical sections adapted to be secured together with their meeting edges in engagement, transverse bearing seats being formed entirely within the assembled ring sections, bearing blocks for said trunnions mounted in said seats and entirely within the assembled ring sections, and means for packing the ends of the said blocks against leakage of lubricant between such ends and the adjacent sides of their respective seats.

9. In a universal joint, the combination, with a driving and a driven member and trunnions carried thereby, of a hollow lubricant-containing connecting ring for said trunnions, the said ring being formed in a pair of symmetrical sections adapted to be assembled with intermediate contacting edges, said sections having seat recesses therein extending transversely thereof and adapted to form complete seats when said sections are assembled, bearing blocks for said trunnions mounted in said seats, each ring section having an annular recess in the inner edge face thereof beyond the seat recesses therein, and a washer in the annular groove formed by assembling said sections.

10. In a universal joint, the combination, with a driving and a driven member and trunnions carried thereby, of a hollow lubricant-containing connecting ring for said trunnions, the said ring being formed in a pair of symmetrical sections adapted to be assembled with intermediate contacting edges, said ring having transverse seats entirely within the sides of said ring, and trunnions mounted in said seats, said ring sections forming, when assembled, an annular groove at the meeting edges thereof beyond the seats therein, and a washer in said groove.

11. In a universal joint, the combination, with a driving and a driven member and trunnions carried thereby, of a hollow lubricant-containing connecting ring for said trunnions, the said ring having seats extending transversely thereof and located entirely within the sides of said ring, bearing blocks for said trunnions within said seats and entirely within the sides of said ring, means for supplying lubricant from the interior of the said ring to the said trunnions, and means preventing the passage of lubricant through centrifugal action about the ends of the said bearing blocks, the said bearing blocks and the seats therefor being so shaped as to permit the blocks to rock in their seats.

12. In a universal joint, the combination, with a driving and a driven member and trunnions carried thereby, of a hollow lubricant-containing connecting ring for said trunnions, the said ring having seats extending transversely thereof and located entirely within the sides of said ring, bearing blocks for said trunnions within said seats and located entirely within the sides of said ring, and means for supplying lubricant from the interior of the said ring to the said trunnions.

In testimony whereof, I hereunto affix my signature.

FREDERICK W. PETERS.